(12) United States Patent
Jones et al.

(10) Patent No.: US 7,334,998 B2
(45) Date of Patent: Feb. 26, 2008

(54) LOW-NOISE FAN EXIT GUIDE VANES

(75) Inventors: Michael G. Jones, Newport News, VA (US); Tony L. Parrott, Williamsburg, VA (US); Laurence J. Heidelberg, Lakewood, OH (US); Edmane Envia, Brunswick, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 98 days.

(21) Appl. No.: 11/005,624

(22) Filed: Dec. 6, 2004

(65) Prior Publication Data

US 2006/0104819 A1     May 18, 2006

Related U.S. Application Data

(60) Provisional application No. 60/533,371, filed on Dec. 8, 2003.

(51) Int. Cl.
*F01D 25/06* (2006.01)

(52) U.S. Cl. .............................. 416/227 R; 416/229 R; 416/233

(58) Field of Classification Search ................ 415/115, 415/119; 416/227 R, 229 R, 231 B, 231 R, 416/232, 233, 241 R
See application file for complete search history.

(56) References Cited

U.S. PATENT DOCUMENTS

| | | | |
|---|---|---|---|
| 2,783,008 A * | 2/1957 | Bodine, Jr. ................. | 244/130 |
| 3,602,333 A | 8/1971 | Kobayashi | |
| 3,820,628 A * | 6/1974 | Hanson ...................... | 181/214 |
| 4,720,239 A * | 1/1988 | Owczarek .................... | 415/181 |
| 4,820,117 A | 4/1989 | Larrabee et al. | |
| 5,498,137 A | 3/1996 | El-Aini et al. | |
| 5,947,688 A * | 9/1999 | Schilling et al. ............ | 416/233 |
| 6,139,259 A | 10/2000 | Ho et al. | |
| 6,224,341 B1 | 5/2001 | Fricke | |
| 6,916,529 B2 * | 7/2005 | Pabla et al. ................. | 428/325 |

* cited by examiner

*Primary Examiner*—Edward K. Look
*Assistant Examiner*—Devin Hanann
(74) *Attorney, Agent, or Firm*—Helen M. Galus

(57) ABSTRACT

Low-noise fan exit guide vanes are disclosed. According to the present invention a fan exit guide vane has an outer shell substantially shaped as an airfoil and defining an interior cavity. A porous portion of the outer shell allows communication between the fluctuations in the air passing over the guide vane and the interior cavity. At least one acoustically resonant chamber is located within the interior cavity. The resonant chamber is in communication with the porous portion of the outer perimeter. The resonant chamber is configured to reduce the noise generated at a predetermined frequency. In various preferred embodiments, there is a plurality of acoustically resonant chambers located within the interior cavity. The resonant chambers can be separated by one or more partitions within the interior cavity. In these embodiments, the resonant chambers can be configured to reduce the noise generated over a range of predetermined frequencies.

16 Claims, 3 Drawing Sheets

LOW-NOISE FAN EXIT GUIDE VANES

CROSS-REFERENCE TO RELATED APPLICATIONS

This application claims the benefit of U.S. Provisional Patent Application No. 60/533,371 filed Dec. 8, 2003, which is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

The present invention relates to turbofan engine noise reduction. Specifically, the present invention relates to reducing turbofan engine noise using innovative exit guide vanes.

2. Description of the Related Art

Fan exit guide vanes in a turbofan engine are used to remove the swirl in the flow downstream of the fan rotor and increase the thrust and efficiency of the engine. However, the exit guide vanes are typically located close enough to the fan rotor that their interaction with the rotor wake perturbations generates high levels of tone and broadband noise. Significant efforts have been directed toward the reduction of this unwanted noise.

The most common technology used to reduce turbofan engine noise involves acoustic treatment, or liners, along the walls of the fan duct, or nacelle, to absorb the interaction noise once it has been generated. However, proper design of liners of this type requires a detailed understanding of sound propagation though the highly complex engine environment.

A more recent approach to reduce turbofan engine noise involves increasing the spacing between the fan and the exit guide vanes so as to mitigate the impinging flow perturbations. This approach attempts to reduce noise at the source, rather than abate the noise elsewhere. Unfortunately, this approach generally leads to an increase in engine length and a corresponding increase in engine weight. Increasing engine weight is highly undesirable due to the associated added fuel burn penalty.

Another source modification approach to reduce turbofan engine noise involves modifying the fan rotor blade and or exit guide vane geometry in a manner that mitigates the strength of the interaction between the two. These modifications include introduction of sweep and/or lean into the fan rotor blades and/or exit guide vanes. However, this approach often requires a delicate balance to be struck between structural integrity of the engine components and the aerodynamic performance of the engine.

The use of resonance or noise reducing chambers or cavities is a known method for reducing noise in various instances. For example, automobiles commonly use combinations of resonators and bulk absorbing materials in mufflers to reduce exhaust noise. One type of resonator, known as a Helmholtz resonator, provides a frequency selective way to modify a complex noise spectrum, where the targeted frequency is a function of the chamber volume, chamber entrance geometry, and the speed of sound. Furthermore, the use of sound absorbing materials inside resonators is also known to improve the noise reduction benefits. However, these methods have heretofore not been applied within the structure of the exit guide vanes to achieve noise reduction in turbofan engines.

Lastly, U.S. Pat. No. 6,139,259, issued to Ho et al., discloses a low noise permeable airfoil. According to the disclosure, this stator airfoil includes a plurality of cross channels that extend through the airfoil. The cross channels bleed fluid between the two sides of the airfoil to reduce the fluctuating pressure differential between the two sides to reduce noise. Unfortunately, this approach degrades the aerodynamic performance of the airfoil, namely, the ability of the airfoil to turn the flow and remove the swirl.

There remains a need for improved turbofan engine noise reduction technologies. Thus, it would be advantageous to provide a new technology for reducing turbofan engine noise without significantly reducing engine performance. Specifically, it would be advantageous to reduce turbofan engine noise using noise resonant chambers inside the fan exit guide vanes.

SUMMARY

In view of the deficiencies described above, it is an object of the present invention to provide improved turbofan engine noise reduction technology, specifically using noise resonant chambers inside the fan exit guide vanes.

It is a further object of the present invention to provide low-noise fan exit guide vanes that do not adversely impact the aerodynamic performance of the exit guide vanes.

According to at least one preferred embodiment of the present invention a fan exit guide vane has an outer shell substantially shaped as an airfoil and defining an interior cavity. A porous portion of the outer shell allows communication between the fluctuations in the air passing over the guide vane and the interior cavity. At least one acoustically resonant chamber is located within the interior cavity. The resonant chamber is in communication with the porous portion of the outer shell.

The resonant chamber is configured to provide a pressure-release surface such that the noise generated at the surface of the exit guide vane at a predetermined frequency is reduced. In various preferred embodiments, there is a plurality of resonant chambers located within the interior cavity. The resonant chambers can be separated by one or more partitions within the interior cavity. In these embodiments, the resonant chambers can be configured to reduce the noise generated over a range of predetermined frequencies.

In various embodiments, the resonant chamber or chambers can be, but are not limited to, Helmholtz resonators. The resonant chambers can also have bulk absorber material disposed within the chambers.

Other features and advantages of the invention will be apparent from the following detailed description taken in conjunction with the following figures, wherein like reference numerals represent like features.

DETAILED DESCRIPTION OF THE INVENTION

Figure 1:
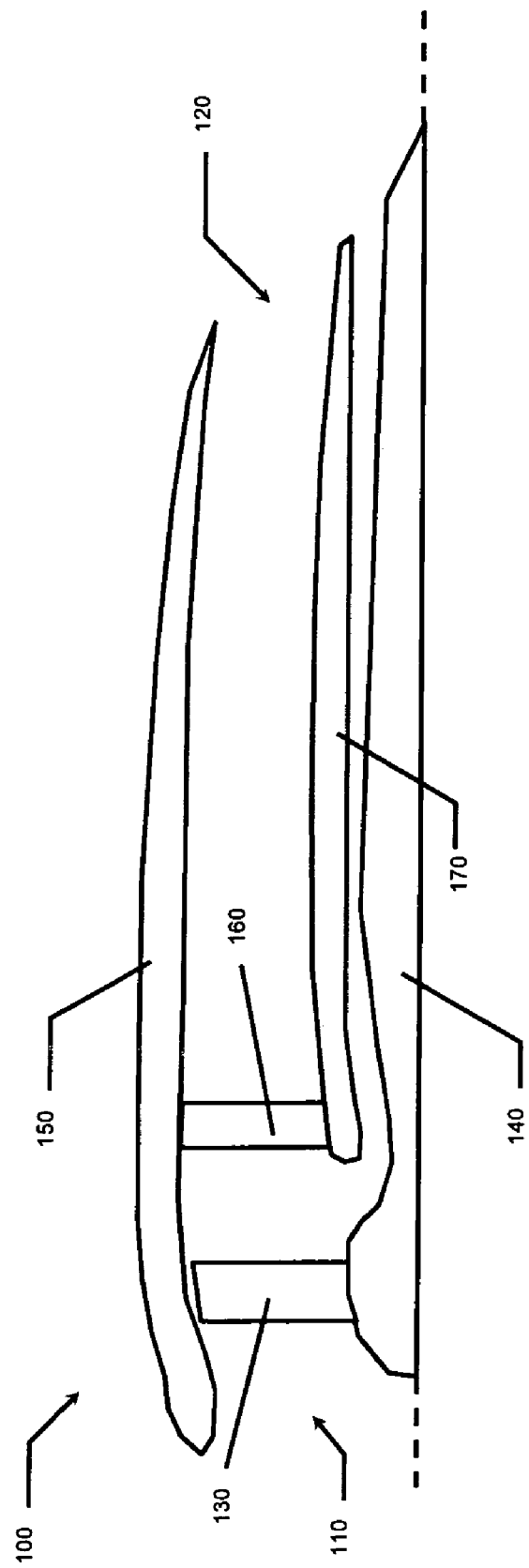
FIG. 1 shows a simplified turbofan engine bypass duct having noise reducing fan exit guide vanes according to the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

FIG. 1 shows a simplified turbofan engine bypass duct having noise reducing fan exit guide vanes according to the present invention. The bypass duct 100 has an inlet nacelle 110 and exhaust outlet 120. Fan blades 130 are mounted on a shaft 140 that rotates. The fan blades 130 extend from the shaft 140 to a point near the duct outer wall 150. Stationary fan exit guide vanes 160 are located aft of the fan blades 130 and extend from the duct inner wall 170 to the duct outer wall 150. Characteristically, fan exit guide vanes 160 are elongated structures, where the length of the fan guide exit vanes 160 is dependent on the geometry of the particular application.

Figure 2:
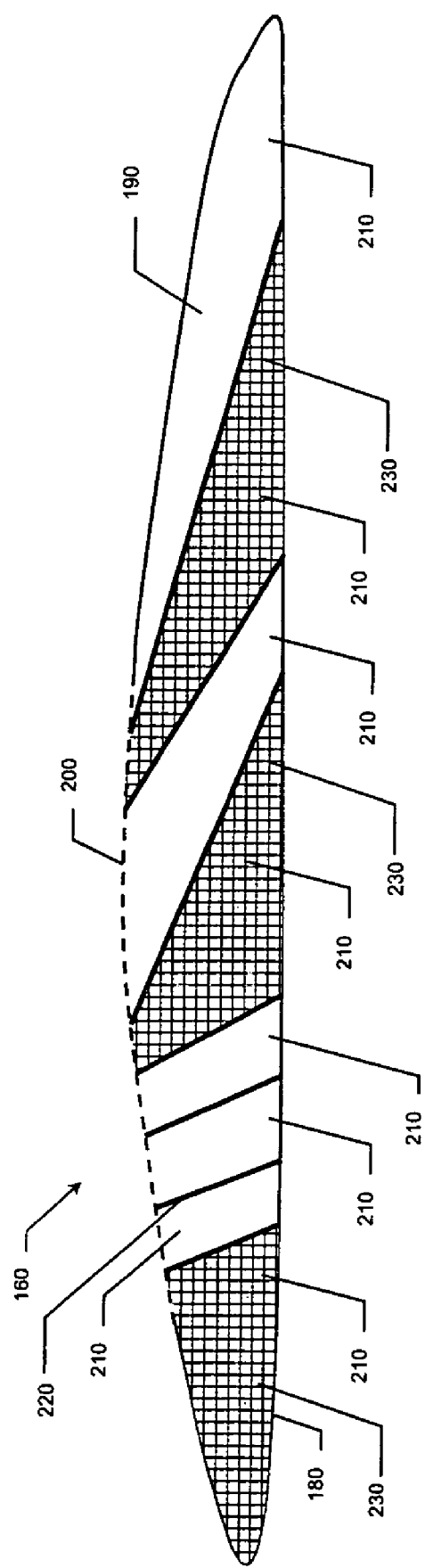
FIG. 2 shows a typical cross section view of a fan exit guide vane with multiple resonant chambers according to the present invention.

FIG. 2 shows one embodiment of a cross section view of a fan exit guide vane with multiple resonant chambers according to the present invention. The fan exit guide vane 160 has an outer shell 180 substantially shaped as an airfoil and defining an interior cavity 190. A porous portion 200 of the outer shell 180 allows communication between the fluctuations in the air passing over the guide vane 160 and the interior cavity 190. At least one acoustically resonant chamber 210 is located within the interior cavity 190. The resonant chamber 210 is in communication with the porous portion 200 of the outer shell 180. The materials used for constructing the present invention are those known in the art.

The resonant chamber 210 is configured to reduce the noise generated at the surface of the exit guide vane 160 at a predetermined frequency. In various preferred embodiments, there is a plurality of resonant chambers 210 located within the interior cavity 190. The resonant chambers 210 can be separated by one or more partitions 220 within the interior cavity 190. In these embodiments, the noise reducing chambers 210 can be configured to reduce the noise generated over a range of predetermined frequencies.

In various embodiments, the resonant chamber 210 can be a Helmholtz resonator, as known in the art. The resonant chambers 210 can have bulk absorber 230 material disposed within the chamber 210. The bulk absorber material 230 can include ceramic beads or other materials known in the art.

Configuring resonant chambers 210, particularly size and shape, to reduce noise at a predetermined frequency is dependent on the particular application and can be accomplished using methods known in the art. These methods can include, but are not limited to, computer based acoustic modeling, analytical modeling using known mathematical formulas for noise generation and propagation, and acoustic chamber and acoustic wind tunnel experimentation. These methods can be used individually or in combination, as is common in the art. In at least one advantageous embodiment the noise resonant chambers inside the fan exit guide vanes are passive, and therefore the injection of air into the region surrounding the fan exit guide vanes is not required.

Preferably, the porous portion 200 of the outer shell 180 is located on the suction side, or top side, of the guide vane 160. Furthermore, there is no communication between the suction side and the pressure side, bottom side, of the guide vane 160. By so locating the porous portion 200, aerodynamic performance of the guide vane 160 is not compromised.

Figure 3:
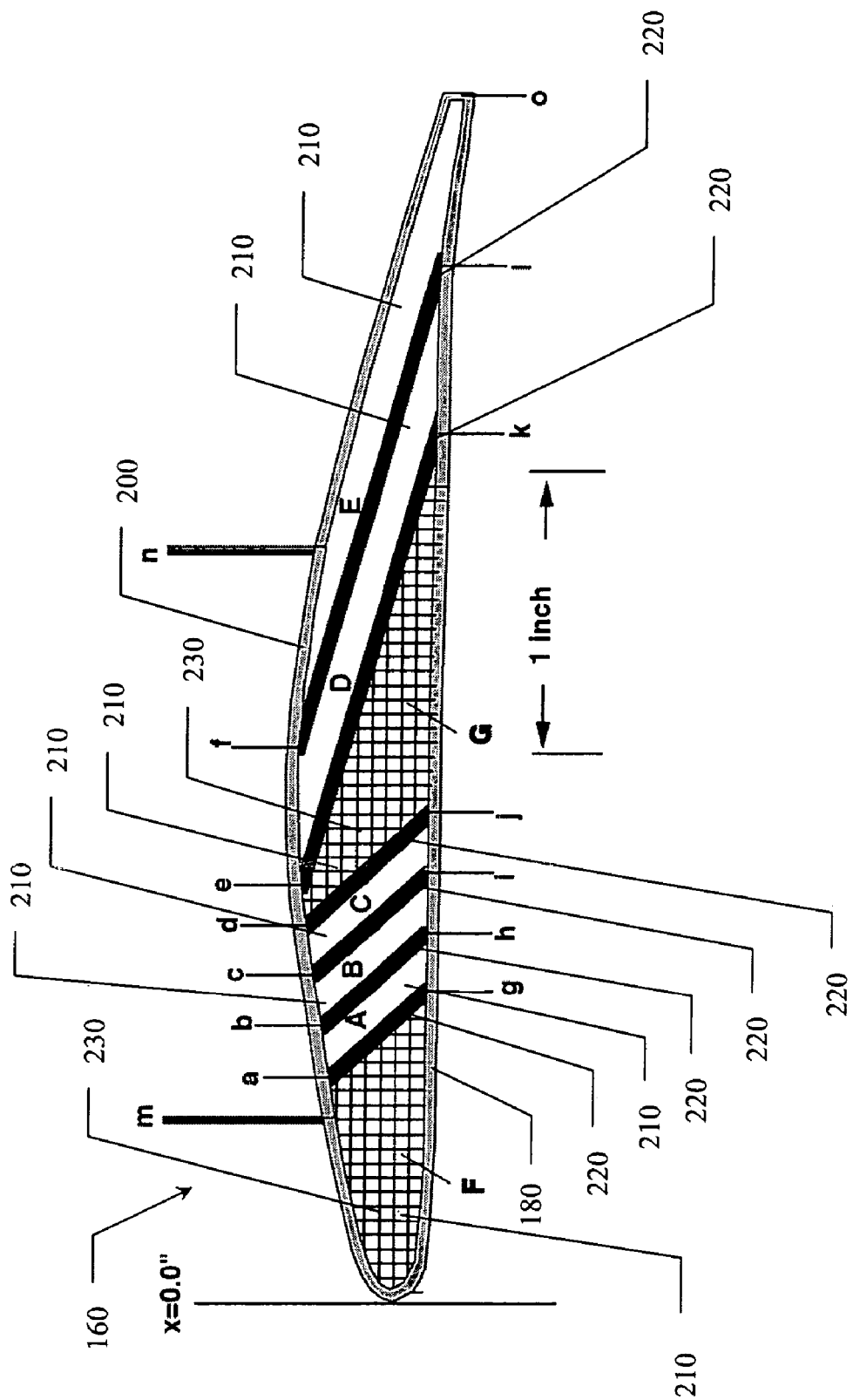
FIG. 3 shows a cross section view of a preferred embodiment of a fan exit guide vane according to the present invention.

FIG. 3 shows a cross section view of a preferred embodiment of a fan exit guide vane according to the present invention. The fan exit guide vane 160 has seven acoustic chambers 210, labeled A through G. Acoustic chambers 210 A, B, C, D, and E are empty. Acoustic chambers 210 F and G are filled with bulk absorber material 230. The porous portion 200 of the outer shell 180 is shown between points "m" and "n". In the shown embodiment, preferably the porous portion 200 has a porosity of about 25 to about 35 percent. However, as would be known to one skilled in the art, a broader range of porosity (e.g., from about 3 to about 35 percent or greater) is possible. Additionally, in at least one embodiment the porous surface 200 can be covered in a manner known in the art, such as by a wire mesh. Similarly, the pore size can be determined in accordance with considerations of aerodynamic performance and self-noise issues relevant to the particular application, as known in the art.

The position of the various components, as shown in FIG. 3, is illustrated in Table 1, where distance is the distance from the left edge (x=0.0") to the labeled point or the center of the labeled partition 220.

TABLE 1

| Label | Distance (inches) |
|---|---|
| a | 0.80 |
| b | 0.99 |
| c | 1.15 |
| d | 1.35 |
| e | 1.49 |
| f | 1.98 |
| g | 1.12 |
| h | 1.32 |
| i | 1.54 |
| j | 1.75 |
| k | 3.10 |
| l | 3.67 |
| m | 0.65 |
| n | 2.65 |
| o | 4.35 |

While specific embodiments have been illustrated and described, numerous modifications come to mind without significantly departing from the spirit of the invention and the scope of protection is limited by the scope of the accompanying claims.

What is claimed is:

1. A low-noise fan exit guide vane forming an elongated structure of a predetermined length, said fan exit guide vane comprising:
    an outer shell substantially shaped as an airfoil and defining an interior cavity, said outer shell having a suction side and a pressure side, a portion of said outer shell being porous;
    at least one acoustically resonant chamber formed within said interior cavity and in communication with said porous portion of said outer shell, and wherein each of said at least one acoustically resonant chamber extends from said suction side to said pressure side; and
    wherein said at least one acoustically resonant chamber is configured to inhibit noise generation at at least one predetermined frequency.

2. The low-noise fan exit guide vane according to claim 1, wherein said at least one acoustically resonant chamber comprises a Helmholtz resonator.

3. The low-noise fan exit guide vane according to claim 1, wherein said at least one acoustically resonant chambers has bulk absorber material disposed within said chamber.

4. A low-noise fan exit guide vane forming an elongated structure of a predetermined length, said fan exit guide vane comprising:
- an outer shell substantially shaped as an airfoil and defining an interior cavity, a portion of said outer shell being porous;
- at least one acoustically resonant chamber formed within said interior cavity and in communication with said porous portion of said outer shell; and
- wherein said bulk absorber material comprises ceramic beads.

5. The low-noise fan exit guide vane according to claim 1, wherein said porous portion of said outer shell has a porosity of between about 3 percent to about 35 percent.

6. A low-noise fan exit guide vane forming an elongated structure of a predetermined length, said exit guide vane comprising:
- an outer shell defining an interior cavity, said outer shell having a suction side and a pressure side, a portion of said outer shell being porous;
- a plurality of acoustically resonant chambers formed within said interior cavity, each chamber being independently in communication with said porous portion of said outer shell and wherein each of said plurality of acoustically resonant chambers substantially extends from said suction side to said pressure side; and
- wherein said plurality of acoustically resonant chambers are configured to inhibit noise generation at at least one predetermined frequency.

7. The low-noise fan exit guide vane according to claim 6, wherein said plurality of acoustically resonant chambers comprises at least one Helmholtz resonator.

8. The low-noise fan exit guide vane according to claim 6, wherein said plurality of acoustically resonant chambers comprises at lease one chamber having bulk absorber material disposed within said chamber.

9. A low-noise fan exit guide vane forming an elongated structure of a predetermined length, said exit guide vane comprising:
- an outer shell defining an interior cavity, a portion of said outer shell being porous;
- a plurality of acoustically resonant chambers formed within said interior cavity, each chamber being independently in communication with said porous portion of said outer shell; and
- wherein said bulk absorber comprises ceramic beads.

10. The low-noise fan exit guide vane according to claim 6, wherein said plurality of acoustically resonant chambers reduces noise generated over a range of predetermined frequencies.

11. The low-noise fan exit guide vane according to claim 6, wherein said porous portion of said outer shell has a porosity of between about 3 percent to about 35 percent.

12. The low-noise fan exit guide vane according to claim 6, wherein said outer shell is substantially shaped as an airfoil.

13. The low-noise fan exit guide vane according to claim 1, wherein said at least one acoustically resonant chamber comprises at least two uncoupled chambers.

14. The low-noise fan exit guide vane according to claim 1, wherein said porous portion extends over a substantial portion of said top suction surface.

15. The low-noise fan exit guide vane according to claim 6, wherein said plurality of acoustically resonant chambers comprise uncoupled chambers.

16. The low-noise fan exit guide vane according to claim 6, wherein said porous portion extends over a substantial portion of said top suction surface.

* * * * *